United States Patent
Defazio et al.

(10) Patent No.: US 9,392,217 B2
(45) Date of Patent: Jul. 12, 2016

(54) AUTOMATICALLY RELOCATING PICTURE-IN-PICTURE WINDOW IN VIDEO CALLS

(71) Applicant: BLACKBERRY LIMITED, Waterloo (CA)

(72) Inventors: Michael Joseph Defazio, Fonthill (CA); Donald Somerset McCulloch McKenzie, Waterloo (CA)

(73) Assignee: BlackBerry Limited, Wateloo, CA (US)

( * ) Notice: Subject to any disclaimer, the term of this patent is extended or adjusted under 35 U.S.C. 154(b) by 48 days.

(21) Appl. No.: 14/220,208

(22) Filed: Mar. 20, 2014

(65) Prior Publication Data

US 2015/0271444 A1 Sep. 24, 2015

(51) Int. Cl.
| | |
|---|---|
| *H04N 7/15* | (2006.01) |
| *H04N 7/14* | (2006.01) |
| *H04N 5/45* | (2011.01) |
| H04N 21/431 | (2011.01) |
| H04N 21/4788 | (2011.01) |

(52) U.S. Cl.
CPC ............... *H04N 7/141* (2013.01); *H04N 5/45* (2013.01); *H04N 7/142* (2013.01); *H04N 7/15* (2013.01); *H04N 21/4316* (2013.01); *H04N 21/4788* (2013.01)

(58) Field of Classification Search
CPC ......... H04N 7/14; H04N 7/141; H04N 7/142; H04N 7/15; H04N 7/152
USPC ............................................. 348/14.01–14.16
See application file for complete search history.

(56) References Cited

U.S. PATENT DOCUMENTS

| | | | |
|---|---|---|---|
| 5,382,972 A * | 1/1995 | Kannes ....................... | 348/14.07 |
| 7,554,571 B1 | 6/2009 | Beck et al. | |
| 8,006,276 B2 | 8/2011 | Nakagawa et al. | |
| 8,350,891 B2 | 1/2013 | Khot et al. | |
| 2002/0140862 A1 | 10/2002 | Dimitrova | |
| 2008/0274796 A1 * | 11/2008 | Lube ....................... | G07F 17/32 463/25 |
| 2009/0315973 A1 * | 12/2009 | Izotov ................... | H04L 65/403 348/14.07 |
| 2011/0249074 A1 | 10/2011 | Cranfill et al. | |
| 2013/0005457 A1 * | 1/2013 | Higgins .............. | G07F 17/3211 463/30 |
| 2013/0083151 A1 * | 4/2013 | Kim .................... | H04L 65/1069 348/14.07 |
| 2014/0269930 A1 * | 9/2014 | Robinson et al. ......... | 375/240.24 |
| 2015/0062434 A1 * | 3/2015 | Deng ....................... | H04N 5/45 348/565 |

FOREIGN PATENT DOCUMENTS

| | | |
|---|---|---|
| JP | H10200873 A | 7/1998 |
| WO | 2005060250 A1 | 6/2005 |

OTHER PUBLICATIONS

European Patent Office, Extended European Search Report on Application No. 15158848.0, Issued on Aug. 3, 2015.

* cited by examiner

*Primary Examiner* — Melur Ramakrishnaiah
(74) *Attorney, Agent, or Firm* — Moffat & Co.

(57) ABSTRACT

A computer-implemented method is performed by a communications device having a processor operatively coupled to a memory and a data transceiver for transmitting and receiving video data of a video call between a user of the device and one or more other parties to the call. The method entails receiving and displaying video images of the one or more other parties within a main video window on a display of the device, identifying one or more faces in the video images, determining a minimally obscuring position for a picture-in-picture (PIP) window that minimally obscures the one or more faces of the other parties, capturing video of the user with a camera on the device, and displaying a PIP window from the video of the user in the minimally obscuring position within the main video window.

14 Claims, 9 Drawing Sheets

AUTOMATICALLY RELOCATING PICTURE-IN-PICTURE WINDOW IN VIDEO CALLS

CROSS-REFERENCE TO RELATED APPLICATIONS

This is the first application filed for the present technology.

TECHNICAL FIELD

The present technology relates generally to communications devices and, in particular, to video calls, videoconferencing and video telephony.

BACKGROUND

Video calls or videoconferencing enable real-time video and audio to be displayed on a computing device. Video calls also typically provide a preview window or self-view window showing the user what the other party or parties can see of the user. This self-view window is frequently displayed as a picture-in-picture (PIP) that is placed in one of the corners of the display. It is also known to manually reposition the preview window to a less obstructive location so as to minimally obstruct the view of the other party or parties. This manual approach is problematic because the party or parties may move thereby requiring the user to continually manually reposition the preview window. A solution to this technical problem is disclosed in this specification.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

The present technology provides a method, computer-readable medium and communications device for video calling, videoconferencing, video chat or video telephony that automatically repositions a self-view picture-in-picture (PIP) window showing the user of the device in a least obtrusive position onscreen so as to avoid obscuring the faces of the other parties to the video call.

Accordingly, one inventive aspect of the present disclosure is a computer-implemented method performed by a communications device having a processor operatively coupled to a memory and a data transceiver for transmitting and receiving video data of a video call between a user of the device and one or more other parties to the call. The method entails receiving and displaying video images of the one or more other parties within a main video window on a display of the device, identifying one or more faces in the video images, determining a minimally obscuring position for a picture-in-picture (PIP) window that minimally obscures the one or more faces of the other parties, capturing video of the user with a camera on the device, and displaying a PIP window from the video of the user in the minimally obscuring position within the main video window.

Another inventive aspect of the present disclosure is a computer-readable medium comprising instructions in code which when loaded into a memory and executed by a processor of a communications device cause the communications device to receive and display video images of one or more other parties to a video call within a main video window on a display of the device, identify one or more faces in the video images, determine a minimally obscuring position for a picture-in-picture (PIP) window that minimally obscures the one or more faces of the other parties, capture video of the user with a camera on the device and display a PIP window from the video of the user in the minimally obscuring position within the main video window.

Another inventive aspect of the present disclosure is a communications device having a processor operatively coupled to memory and to a data transceiver for transmitting and receiving video data of a video call between a user of the device and one or more other parties to the video call and a display for displaying video images of the one or more other parties within a main video window. The processor is configured to identify one or more faces in the video images and to determine a minimally obscuring position for a picture-in-picture (PIP) window that minimally obscures the one or more faces of the other parties. The device also includes a camera for capturing video of the user for the PIP window. The processor interacts with the display to display the PIP window in the minimally obscuring position within the main video window.

The details and particulars of these aspects of the technology will now be described below, by way of example, with reference to the drawings.

Figure 1:
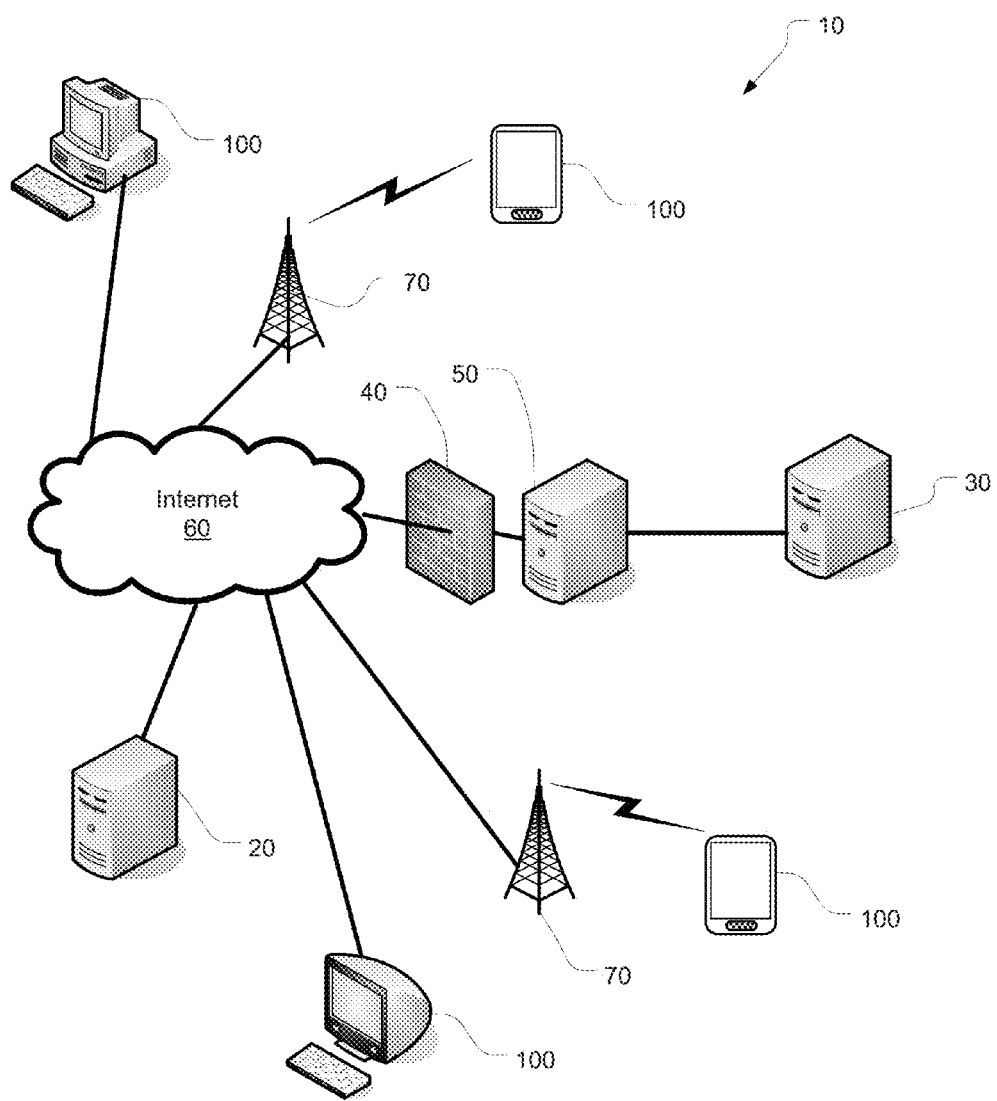
FIG. 1 is a schematic depiction of a system for video calling.

FIG. 1 schematically depicts a telecommunication system 10 for video calls. For the purposes of this specification, video calls are meant to encompass videoconferencing, video chat or any other form of video telephony in which two or more parties to the call are able to view live (real-time) video of each other on their respective communications devices. Video includes both video image frames and synchronized audio. The video call may include a single viewport (or "main video window") with the automatically repositionable PIP window or it may include a split screen of multiple video windows, i.e. a composite video window divided into sub-windows, in the case of a videoconference with multiple other parties. The technology may thus be used in at least the following scenarios: a single face in a single main video window, multiple faces in a single main video window, multiple faces in multiple video windows. In each scenario, the PIP window is dynamically and automatically relocated to avoid obscuring (or to at least minimally obscure) the faces in the video window(s).

The system may be implemented as a data packet communication system using for example Internet Protocol (e.g. IPv6) or more specifically using voice over internet protocol (VoIP) service. The system 10 may be implemented as a peer-to-peer system, a client-server system or a hybrid peer-to-peer and client-server system.

As shown by way of example in FIG. 1, the system 10 includes a video call server 20 that mediates the video call between two or more communications devices 100. The communications devices 100 may be desktop computers, laptops, notebooks or mobile devices such as wireless communications devices, smart phones, cell phones, tablets, portable digital assistants or any other such portable or handheld electronic communications devices that have a processor, memory, data transceiver (e.g. modem or communications port), camera, microphone, speaker or audio output port and display or display output port. The communications device 100 may have embedded components or peripherally connected components, e.g. externally connected speakers, microphone, webcam, display, projector etc. Such peripheral connected components may be connected directly or wirelessly.

As shown in FIG. 1, the video call server 20 communicates with each communications device 100 through a data network, e.g. the Internet 60. If the communications device 100 is a mobile device (or wireless communications device), a wireless network that includes a base station transceiver 70 for radiofrequency communication with the mobile device using GSM, LTE, CDMA or any other cellular technology. Data packet transmission over the air may be accomplished using GPRS, EDGE, Evolved EDGE, HSPA, etc.

As further depicted in FIG. 1, a different type of video call may alternatively be handled by a different video call server 30 that is accessible via firewall 40 and enterprise server 50.

Figure 2:
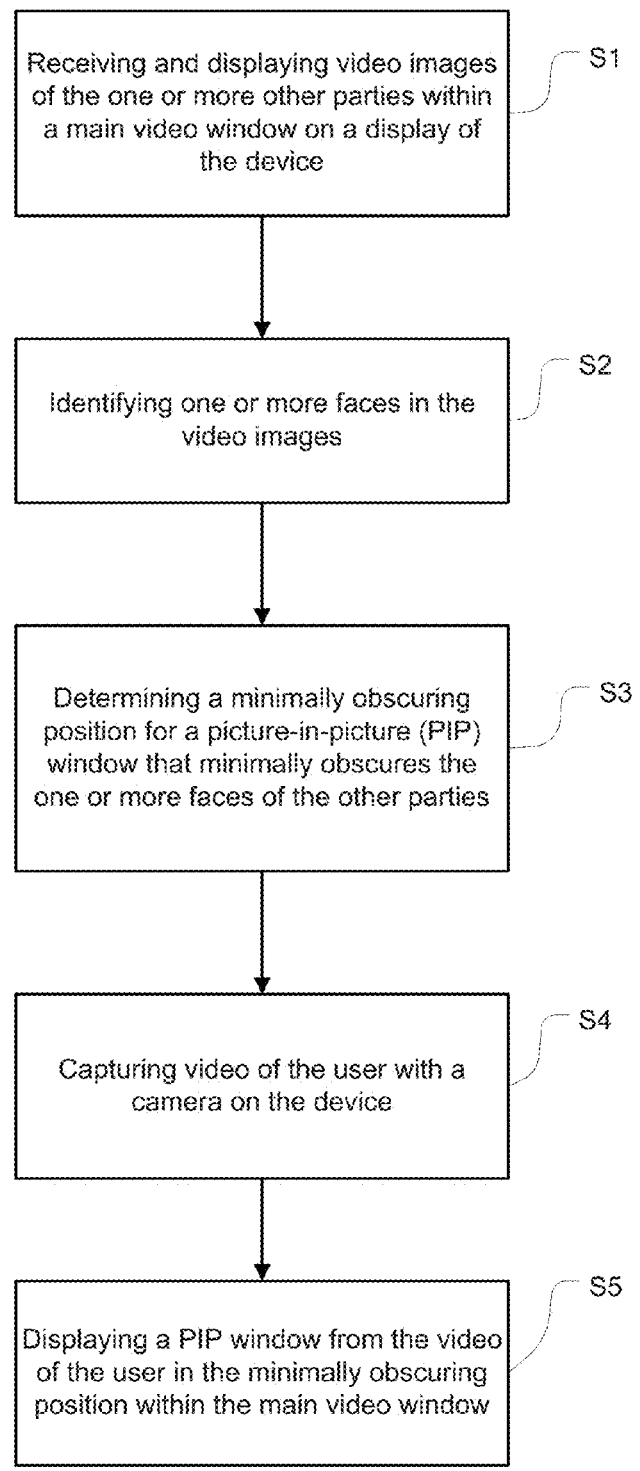
FIG. 2 is a flowchart depicting main steps of a method of video calling in which the PIP window is automatically repositioned.

FIG. 2 is a flowchart depicting steps, acts or operations of a computer-implemented method of video calling. The computer-implemented method is performed by a communications device 100 having a processor operatively coupled to a memory and a data transceiver for transmitting and receiving video data of a video call between a user (or multiple users) of the device and one or more other parties to the video call. This method is applicable to a scenario where there are two devices on a direct video call or more than two devices connected on a videoconference (or conference bridge). Each device may be used by a single party or multiple parties.

As depicted in FIG. 2, the method entails a step, act or operation S1 of receiving and displaying video images of the one or more other parties within a main video window on a display of the device. As further depicted in FIG. 2, the method includes a step, act or operation S2 of identifying one or more faces in the video images. Identifying the one or more faces may be accomplished using any suitable face-recognition algorithm. The processor then determines (at step, act or operation S3) a minimally obscuring position for a picture-in-picture (PIP) window that minimally obscures the one or more faces of the other parties. The PIP window is also referred to as a preview window or user self-view window as it presents the camera feed. The PIP window is generated by capturing video of the user with a camera on the device (at step, act or operation S4), e.g. a forward-facing camera, webcam, etc. The method then entails a step, act or operation S5 of displaying a PIP window from the video of the user in the minimally obscuring position within the main video window. Optionally, the PIP window may be displayed in one of a plurality of preset locations, e.g. top right, top left, bottom right, bottom left. As another option, the PIP window may be positioned in a corner farthest from the one or more faces. The steps, acts or operations S1-S5 may be performed sequentially in the order presented above or in a different order or with some steps, acts or operations performed in parallel or partly in parallel. The steps, acts or operations S1-S5 may be performed by the communications device or one or more of these steps, acts or operations may be performed by a server such as the video call server. For example, in a variant, the identification of the faces (S2) may be performed by the video call server. Likewise, the determination of the optimal onscreen position for the PIP window (S3) may be performed by the video call server.

In some cases, all four corners of the main video window may be occupied by a face or multiple faces. In other words, if every corner of the main video window is displaying one or more faces, the processor may determine a position for the PIP window that obscures a fewest number of faces. In addition to positioning the PIP window to obscure the fewest number of faces, the PIP window may also be shrunk. Optionally, the device may enable the user to prioritize or rank the visibility of the other parties to ensure that only certain parties are obscured but not others.

Alternatively, if all corners of the main video window display a face, the method may entail determining a position for the PIP window that is a greatest average distance from all faces. In addition to positioning the PIP window the greatest average distance from all faces, the PIP window may also be shrunk.

The one or more faces in the video images may move around during the video call. In some cases, the one or more faces may move into a location that is currently obscured by the PIP window. The method may thus further entail repositioning the PIP window in response to detecting that one or more faces are obscured by the PIP window. To avoid the PIP window jumping around onscreen as faces move, a time threshold may be imposed. In other words, the method may thus further entail repositioning the PIP window in response to detecting that one or more faces are obscured by the PIP window for more than a predetermined period of time. The time threshold (predetermined period of time) may be user-specified in a settings or options page or may be preset by the device.

This method may be implemented by a mobile device as one example of a communications device 100. As shown by way of example in FIG. 3, the device 100 includes a processor 110 and memory 120, 130 for executing a video call application, e.g. video chat application, videoconferencing application, etc. The memory 120, 130 may include flash memory 120 and/or random access memory (RAM) 130. Other types or forms of memory may be used.

Figure 3:
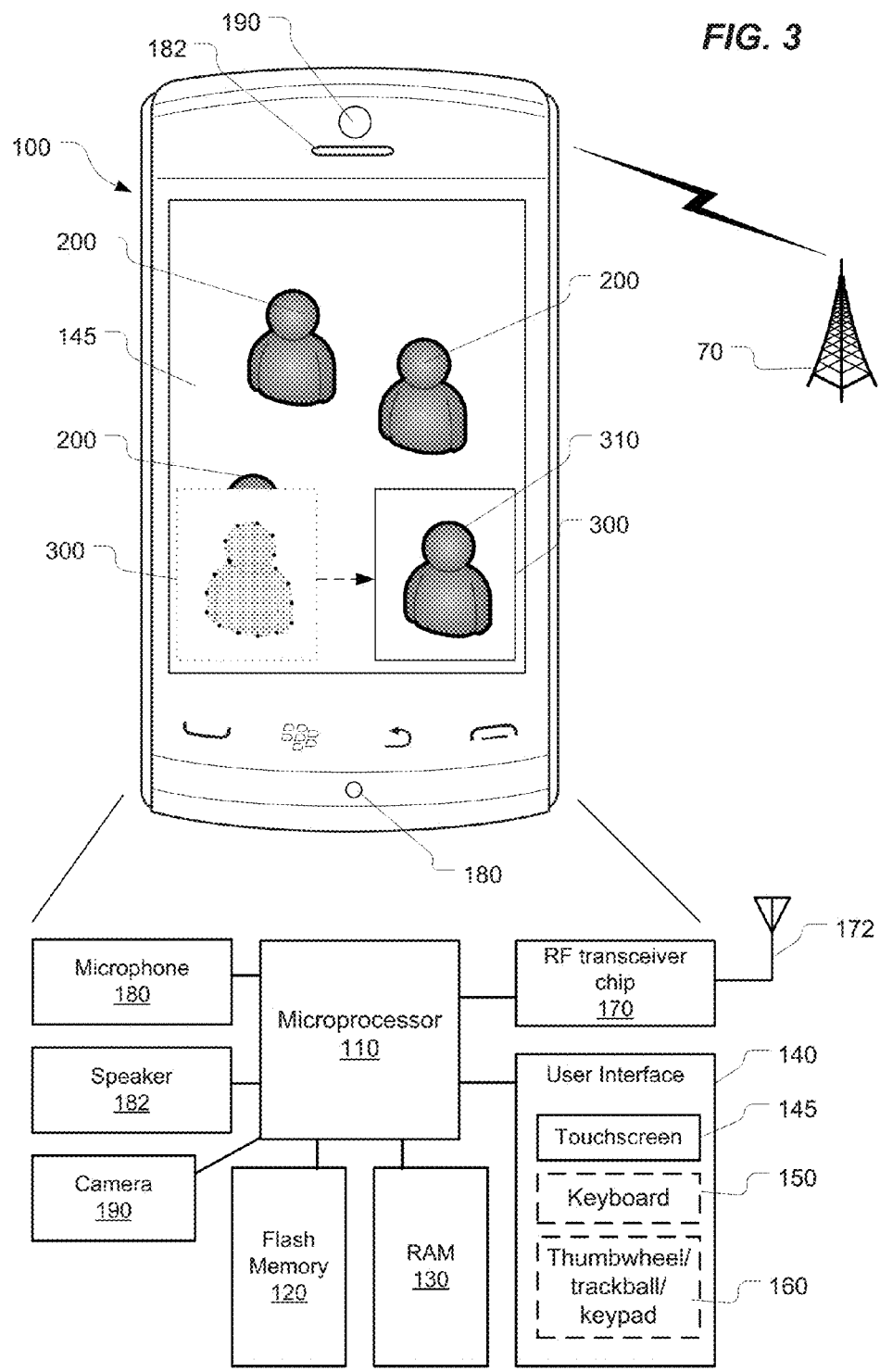
FIG. 3 is a depiction of a communications device capable of repositioning a PIP window to a minimally obscuring position to avoid obscuring one or more faces.

As depicted by way of example in FIG. 3, the communications device 100 includes a user interface 140 for interacting with the device and the video call application, e.g. for receiving user input to initiate a video call or to accept an incoming request to participated in a video call. The user interface 140 may include one or more input/output devices, such as a display screen 145 (e.g. an LCD or LED screen or touch-sensitive display screen), and an optional keyboard or keypad 150. The user interface may also include an optical jog pad 160 and/or a thumbwheel, trackball, track pad or equivalent. The device 100 may include a wireless transceiver 170 connected to an antenna 172 for radiofrequency (RF) communication with one or more base station transceivers 70 over a cellular wireless network using cellular communication protocols and standards for both voice calls and packet data transfer such as GSM, CDMA, GPRS, EDGE, UMTS, LTE, etc. Where the device 100 is a wireless communications device, the device may include a Subscriber Identity Module (SIM) card 112 for GSM-type devices or a Re-Usable Identification Module (RUIM) card for CDMA-type devices. The RF transceiver 170 may include separate voice and data channels. The device 100 may optionally include one or more ports or sockets for wired connections, e.g. USB, HDMI, FireWire (IEEE 1394), etc. or for receiving non-volatile memory cards, e.g. SD (Secure Digital) card, miniSD card or microSD card. For video calls, the device 100 includes a microphone 180, a speaker 182 and/or an earphone output jack. The communications device 100 includes a forward-facing camera 190 to capture video images of the user. For example, the forward-facing camera may be any suitable digital camera with video recording capability, e.g. a multiple-megapixel fixed-focus camera with image and video stabilisation, digital zoom and high-definition (HD) video recording capability. The video images are displayed within the PIP window 300 displaying a video image 310 of the user.

Figure 4:
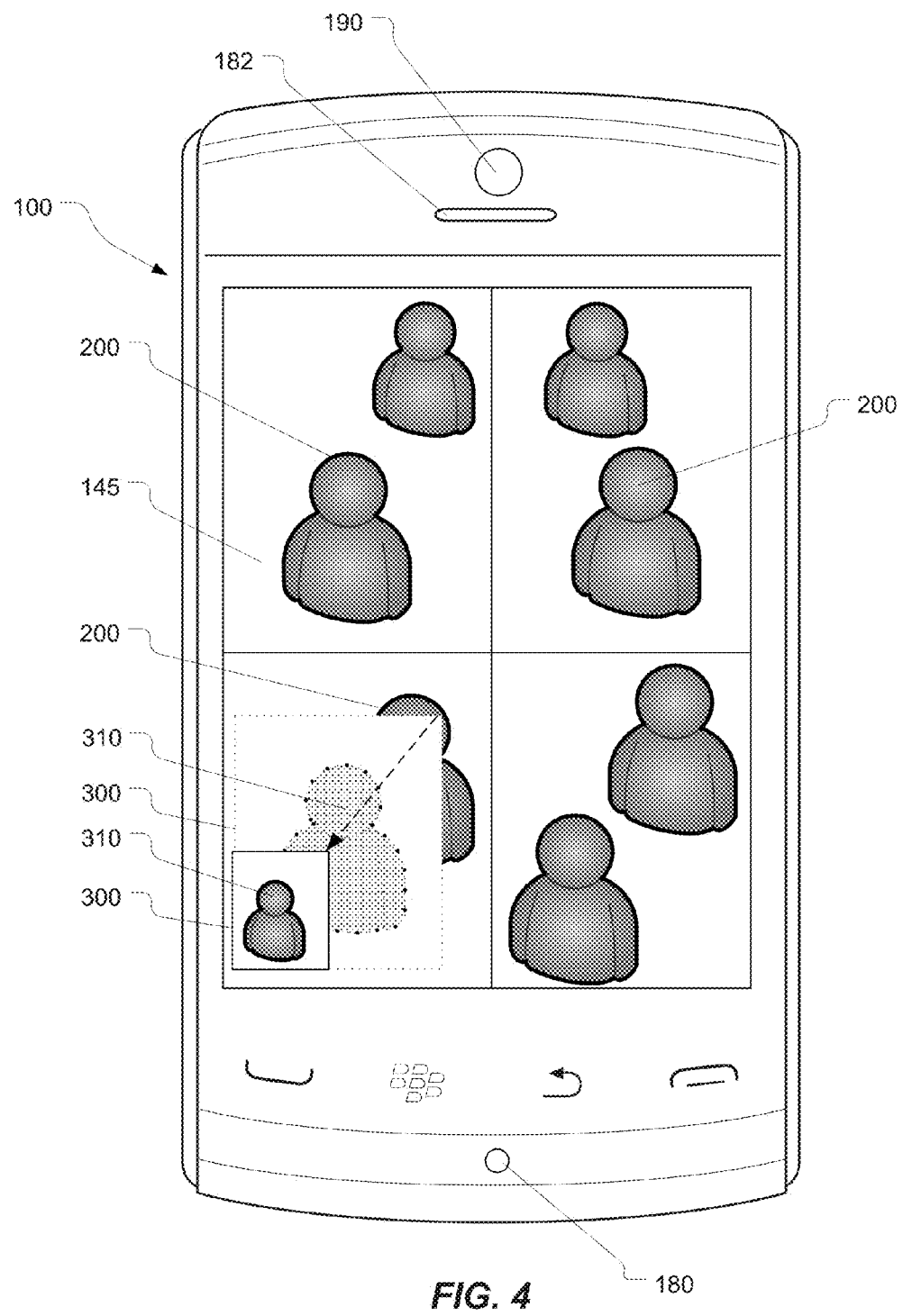
FIG. 4 depicts a shrinking of the PIP window to avoid obscuring one or more faces.
Figure 5:
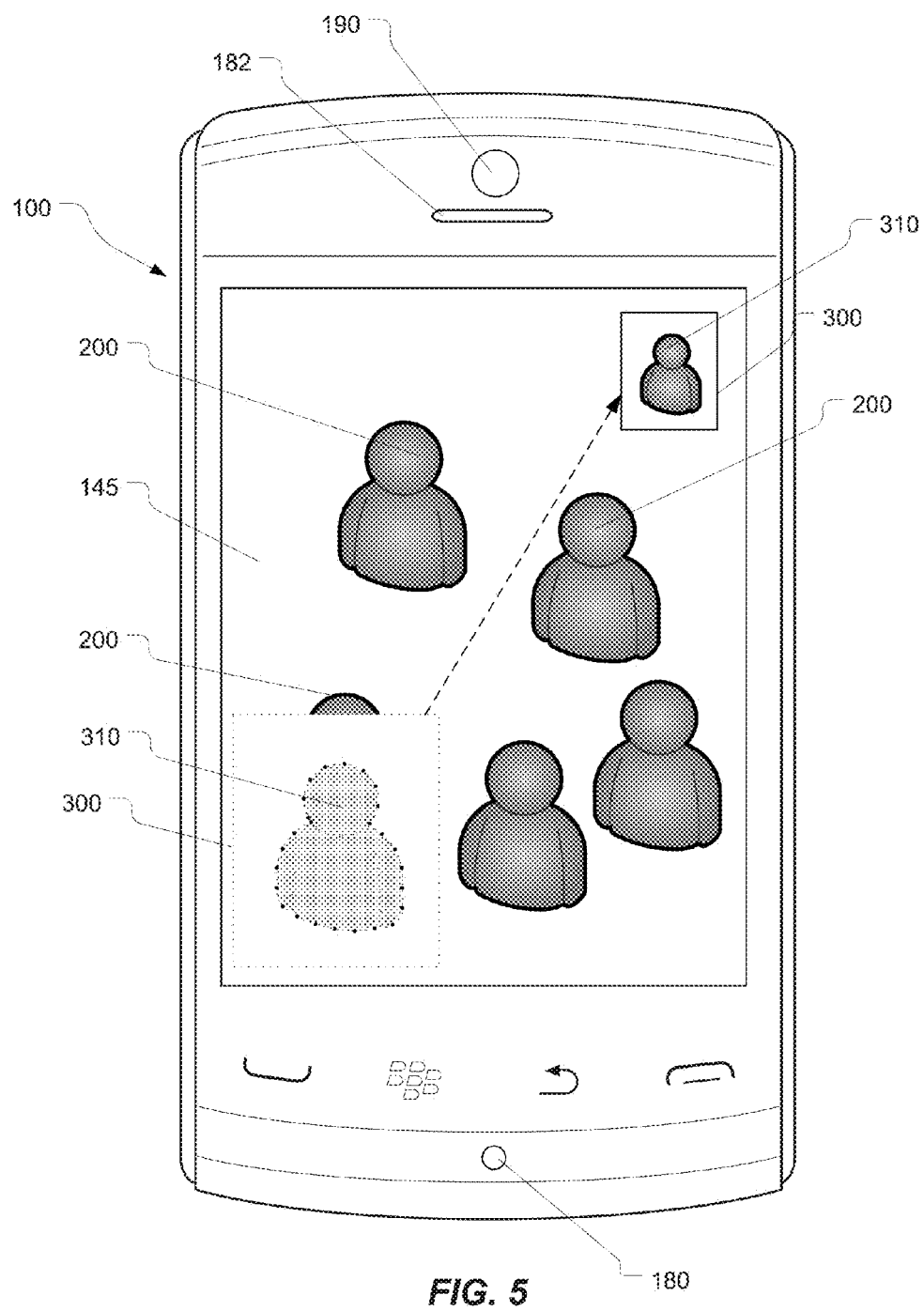
FIG. 5 depicts both a shrinking and repositioning of the PIP window to avoid obscuring one or more faces.

In some instances in which the main video window displays multiple faces 200 it is not possible to find a suitable onscreen position for the PIP window 300 that does not obscure at least one face 200. In that case, as depicted by way of example in FIG. 4, the processor 110 of the communication device 100 may optionally shrink the PIP window 300 to avoid obscuring the one or more faces 200. The shrink function may be disabled by the user. Furthermore, the degree of shrinkage may be automatically determined by the device or it may be determined (i.e. limited) by a user-specified parameter. For example, the user may not wish the PIP window to be shrunk by more than 50% or, alternatively, not to be shrunk to less than x by y pixels. In a variant, the processor 110 of the communication device 100 may both relocate and shrink the PIP window 300 as shown by way of example in FIG. 5.

Figure 6:
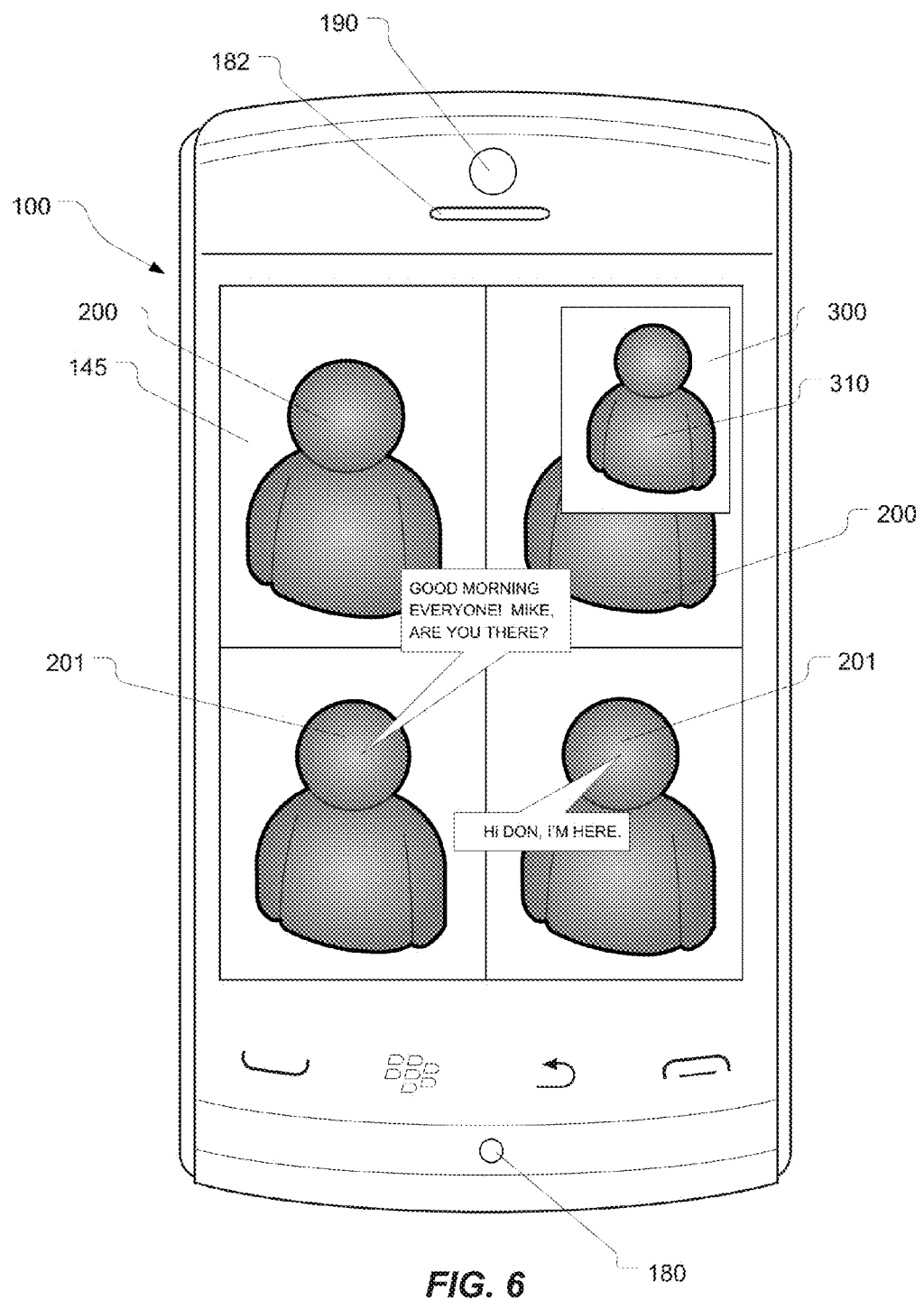
FIG. 6 depicts a repositioning of the PIP window to avoid obscuring a speaker.

As another option, one or more speakers may be identified from among the one or more parties. The PIP window may thus be repositioned to avoid obscuring the one or more speakers. In other words, the PIP window may obscure the parties that not speaking to maintain the visibility of the one or more parties that are speaking. This is illustrated with an example in FIG. 6. In this example, a first speaker 201 speaks to a second speaker 201. The first speaker 201 says "Good morning, everyone! Mike, are you there?" The second speaker 201 replies "Hi Don, I'm here." In this example, only the parties in the bottom left and bottom right windows are speaking. The parties in the top left and top right windows are not speaking. The communications device 100 recognizes which parties are speaking and which are not speaking. Based on this determination, the PIP window 300 may be positioned (or repositioned) to obscure the face 200 of one of the silent (non-speaking) parties so as to avoid obscuring the faces 201 of the speaking parties.

Figure 7:
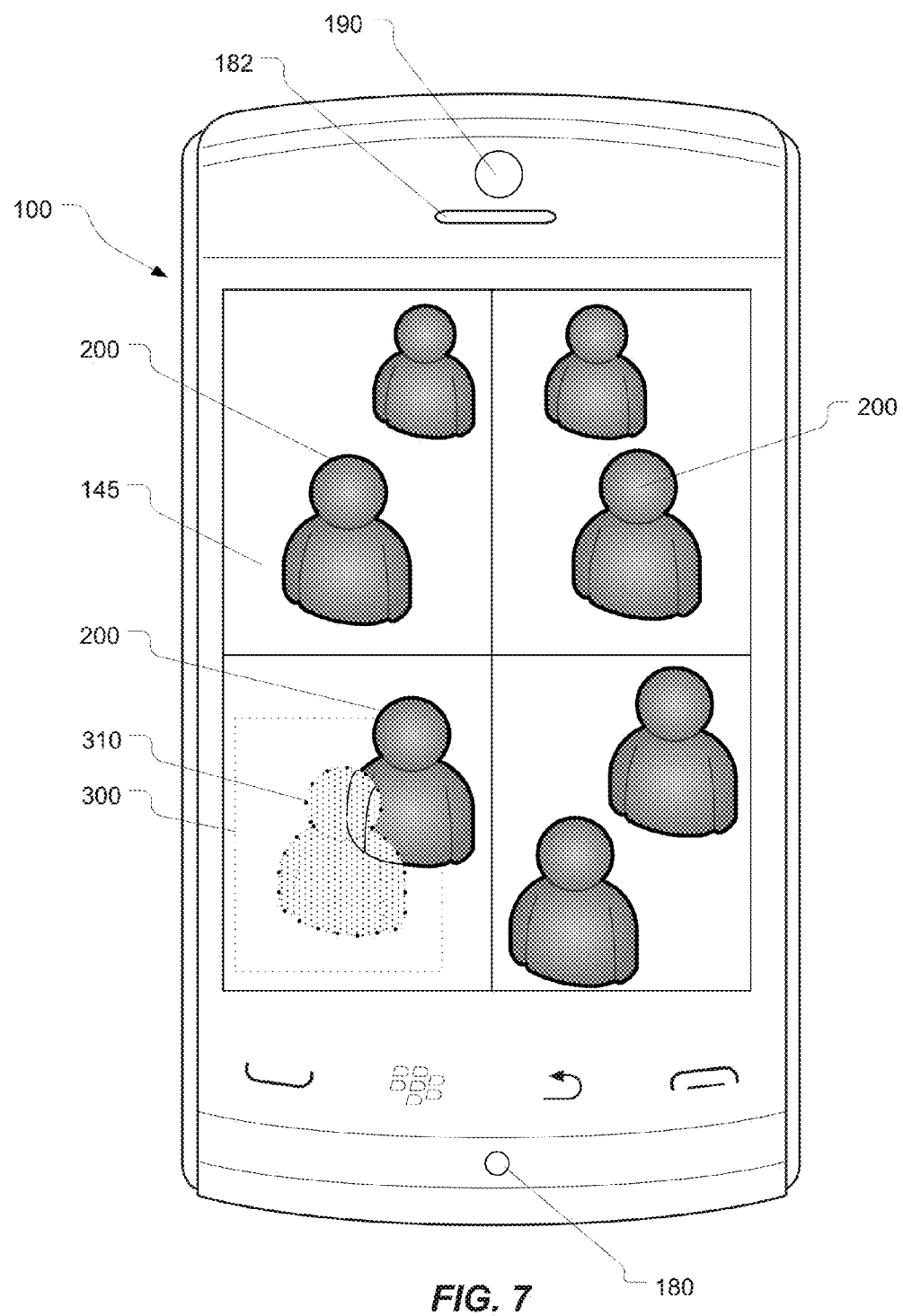
FIG. 7 depicts the use of a partially transparent PIP window to avoid obscuring the underlying video images.

In another embodiment, which is depicted in FIG. 7, the PIP window may be partially transparent or semi-transparent (i.e. a see-through "ghost image") overlaid on the main video window, permitting the portion of the main video window underlying the PIP window to be at least partially visible through the partially transparent PIP window. This embodiment enables all of the faces in the underlying main video window to be visible. In a variant, a transparency of the partially transparent PIP window may be manually adjusted in response to user input. In another variant, the transparency of the partially transparent PIP window may be automatically adjusted (or dynamically varied) in response to a detected event, condition or trigger. For example, detecting that a currently obscured party has begun speaking may be the event or trigger that causes the partially transparent PIP window to increase its transparency to make the speaking party more visible.

In another embodiment, the PIP window may shrink and/or become more transparent when the user is not speaking or if the user has not spoken for more than a predetermined period of time.

Figure 8:
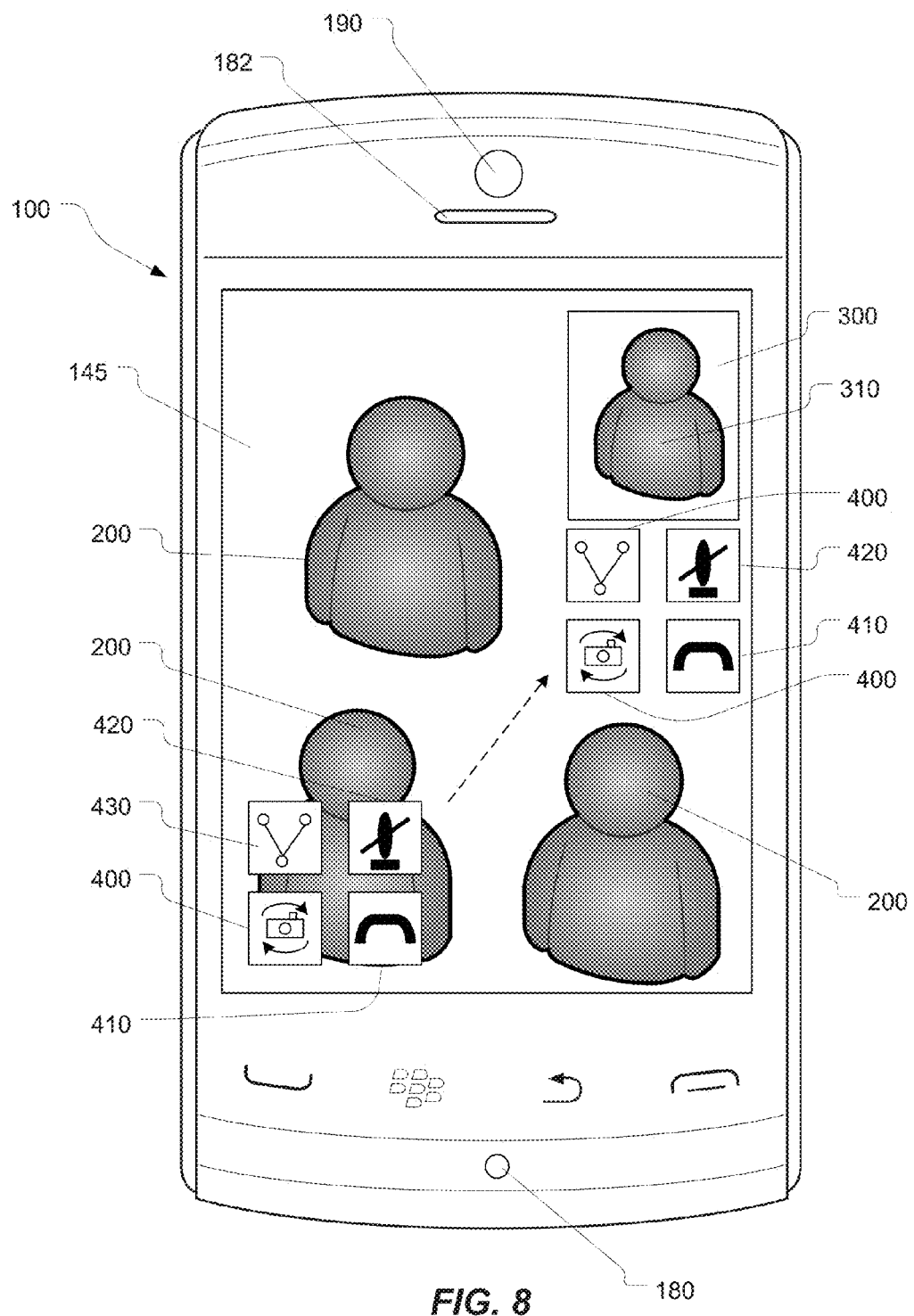
FIG. 8 depicts the relocation of four touchscreen buttons as a group.
Figure 9:
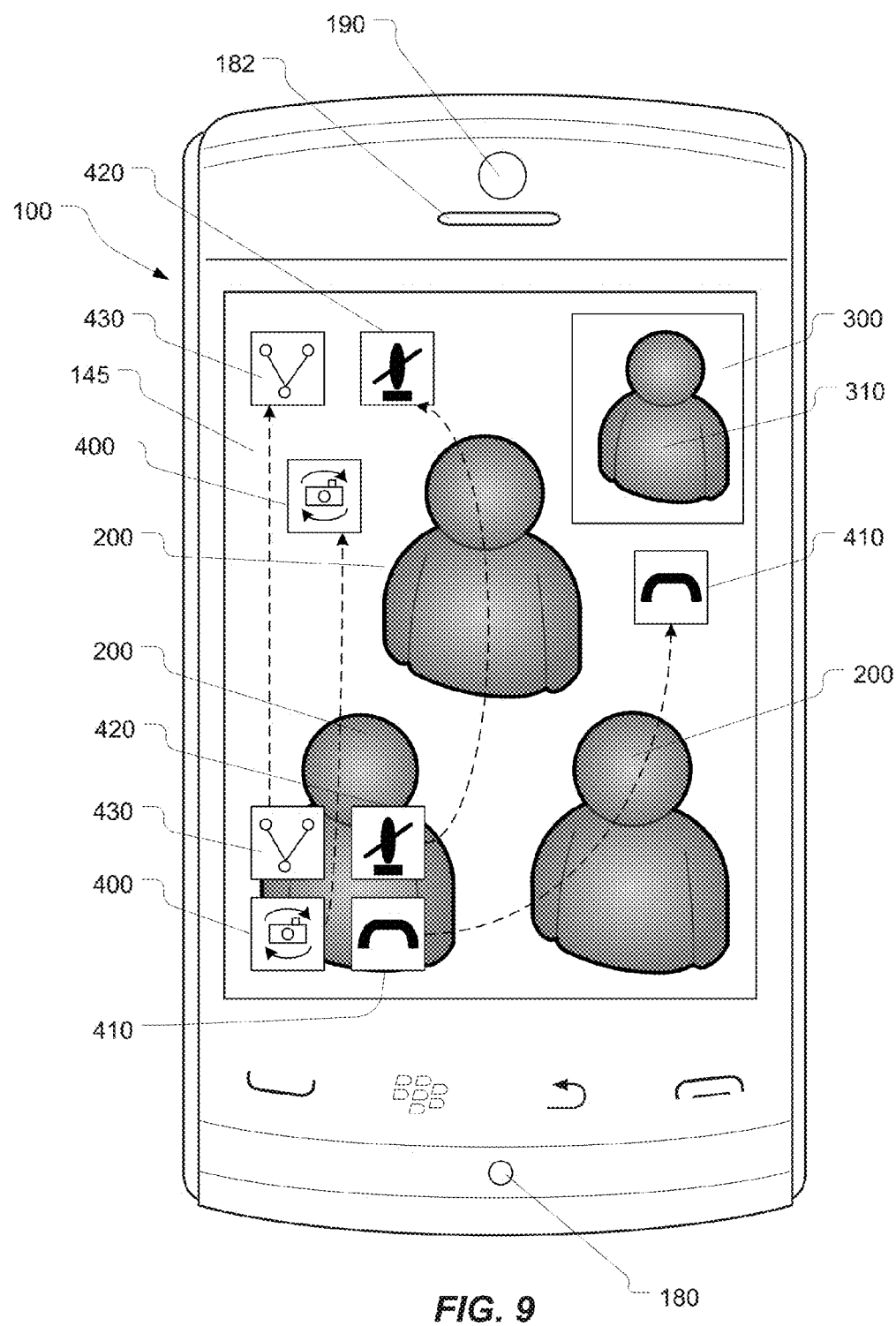
FIG. 9 depicts another way of individually relocating the touchscreen buttons.

In the embodiment shown by way of example in FIG. 8, the touchscreen display 145 presents touchscreen buttons (or touch-sensitive user interface elements) which are responsive to touch to control call-related functions. For example, the display 145 may present a camera selector 400 to switch between the forward-facing camera 190 and a rearward-facing camera. The forward-facing camera 190 is employed to capture video imagery of the user(s) of the device during the call. The rearward-facing camera may be employed for other purposes such as showing a video feed of something other than the user(s) such as, for example, a surrounding scene, a point of interest, an ongoing event, another person or an object. The display 145 may also present an end-call button 410, a mute button 420 and a screen share button 430. These buttons may be automatically relocated as a group to a less obtrusive location onscreen as shown in FIG. 8. In another embodiment, which is depicted by way of example in FIG. 9, the buttons 400, 410, 420, 430 may be individually repositioned, i.e. not as a group but scattered as individual buttons to the most suitable onscreen locations. In variants of the embodiments of FIGS. 8 and 9, the buttons or user interface elements 400-430 may be varied in appearance and/or size to avoid obscuring one or more faces in the main video window. For example, one or more of the user interface elements 400-430 may become partially transparent and/or diminished in size to avoid obscuring faces.

Any of the methods disclosed herein may be implemented in hardware, software, firmware or any combination thereof. Where implemented as software, the method steps, acts or operations may be programmed or coded as computer-readable instructions and recorded electronically, magnetically or optically on a fixed or non-transitory computer-readable medium, computer-readable memory, machine-readable memory or computer program product. In other words, the computer-readable memory or computer-readable medium comprises instructions in code which when loaded into a memory and executed on a processor of a computing device cause the computing device to perform one or more of the foregoing method(s).

A computer-readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

This invention has been described in terms of specific embodiments, implementations and configurations which are intended to be exemplary only. Persons of ordinary skill in the art will appreciate, having read this disclosure, that many obvious variations, modifications and refinements may be made without departing from the inventive concept(s) presented herein. The scope of the exclusive right sought by the Applicant(s) is therefore intended to be limited solely by the appended claims.

The invention claimed is:

1. A computer-implemented method performed by a communications device having a processor operatively coupled to a memory and a data transceiver for transmitting and receiving video data of a video call between a user of the device and one or more other parties to the call, the method comprising:
   receiving and displaying video images of the one or more other parties within a main video window on a display of the device;
   identifying one or more faces in the video images;
   determining a minimally obscuring position for a picture-in-picture (PIP) window that minimally obscures the one or more faces of the other parties;
   capturing video of the user with a camera on the device; and
   displaying a PIP window from the video of the user in the minimally obscuring position within the main video window;
wherein determining the minimally obscuring position for the PIP window comprises determining a position for the PIP window that is a greatest average distance from all of the one or more faces.

2. The method as claimed in claim 1 further comprising repositioning the PIP window in response to detecting that one or more faces are obscured by the PIP window for more than a predetermined period of time.

3. The method as claimed in claim 1 further comprising shrinking the PIP window to avoid obscuring one or more faces.

4. The method as claimed in claim 1 further comprising identifying one or more speakers from among the one or more parties and positioning the PIP to avoid obscuring the one or more speakers.

5. The method as claimed in claim 1 wherein displaying the PIP window comprises displaying the PIP in one of a plurality of preset locations.

6. A non-transitory computer-readable medium comprising instructions in code which when loaded into a memory and executed by a processor of a communications device cause the communications device to:
   receive and display video images of one or more other parties to a video call within a main video window on a display of the device;
   identify one or more faces in the video images;
   determine a minimally obscuring position for a picture-in-picture (PIP) window that minimally obscures the one or more faces of the other parties;
   capture video of the user with a camera on the device; and
   display a PIP window from the video of the user in the minimally obscuring position within the main video window;
wherein determining the minimally obscuring position for the PIP window comprises determining a position for the PIP window that is a greatest average distance from all of the one or more faces.

7. The non-transitory computer-readable medium as claimed in claim 6 further comprising code for repositioning the PIP window in response to detecting that one or more faces are obscured by the PIP window for more than a predetermined period of time.

8. The non-transitory computer-readable medium as claimed in claim 6 further comprising code for shrinking the PIP window to avoid obscuring one or more faces.

9. The non-transitory computer-readable medium as claimed in claim 6 further comprising code for identifying one or more speakers from among the one or more parties and positioning the PIP to avoid obscuring the speakers.

10. The non-transitory computer-readable medium as claimed in claim 6 wherein the code for displaying the PIP window comprises displaying the PIP in one of a plurality of preset locations.

11. A communications device comprising:
   a processor operatively coupled to memory and to a data transceiver for transmitting and receiving video data of a video call between a user of the device and one or more other parties to the video call;
   a display for displaying video images of the one or more other parties within a main video window;
   wherein the processor is configured to identify one or more faces in the video images and to determine a minimally obscuring position for a picture-in-picture (PIP) window that minimally obscures the one or more faces of the other parties;
   a camera for capturing video of the user for the PIP window; and
   wherein the processor interacts with the display to display the PIP window in the minimally obscuring position within the main video window;
wherein determining the minimally obscuring position for the PIP window comprises determining a position for the PIP window that is a greatest average distance from all of the one or more face.

12. The device as claimed in claim 11 wherein the processor repositions the PIP window in response to detecting that one or more faces are obscured by the PIP window for more than a predetermined period of time.

13. The device as claimed in claim 11 wherein the processor shrinks the PIP window to avoid obscuring one or more faces.

14. The device as claimed in claim 11 wherein the processor identifies one or more speakers from among the one or more parties and positions the PIP to avoid obscuring the speakers.

* * * * *